United States Patent
Makadia et al.

(10) Patent No.: US 9,920,166 B2
(45) Date of Patent: Mar. 20, 2018

(54) HALOGEN-FREE FLAME RETARDANT TPU WITH VERY HIGH LOI

(71) Applicant: Lubrizol Advanced Materials, Inc., Cleveland, OH (US)

(72) Inventors: Chetan M. Makadia, Strongsville, OH (US); Ann Giovannitti-Jensen, Bay Village, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 0 days.

(21) Appl. No.: 14/406,902

(22) PCT Filed: Jun. 5, 2013

(86) PCT No.: PCT/US2013/044202
§ 371 (c)(1),
(2) Date: Dec. 10, 2014

(87) PCT Pub. No.: WO2013/191902
PCT Pub. Date: Dec. 27, 2013

(65) Prior Publication Data
US 2015/0152222 A1     Jun. 4, 2015

Related U.S. Application Data

(60) Provisional application No. 61/660,869, filed on Jun. 18, 2012.

(51) Int. Cl.

| | | |
|---|---|---|
| C08G 71/04 | (2006.01) | |
| C08K 3/32 | (2006.01) | |
| C09K 21/12 | (2006.01) | |
| C08G 18/44 | (2006.01) | |
| C08K 5/523 | (2006.01) | |
| C08K 5/00 | (2006.01) | |
| C08K 5/49 | (2006.01) | |
| C08K 5/51 | (2006.01) | |
| C08G 64/02 | (2006.01) | |
| C08G 64/06 | (2006.01) | |
| C08K 5/52 | (2006.01) | |
| C09K 21/14 | (2006.01) | |
| C08K 3/38 | (2006.01) | |
| H01B 3/30 | (2006.01) | |

(52) U.S. Cl.
CPC ............ *C08G 71/04* (2013.01); *C08G 18/44* (2013.01); *C08G 64/0208* (2013.01); *C08G 64/06* (2013.01); *C08K 3/32* (2013.01); *C08K 5/0066* (2013.01); *C08K 5/49* (2013.01); *C08K 5/51* (2013.01); *C08K 5/523* (2013.01); *C08K 5/5205* (2013.01); *C09K 21/12* (2013.01); *C09K 21/14* (2013.01); *C08K 3/38* (2013.01); *H01B 3/307* (2013.01)

(58) Field of Classification Search
CPC ......... C08L 75/04; C08K 3/3238; C08K 5/49; C08K 5/51; C08K 5/523; C08K 5/0066; C08K 5/5205; C08G 18/44; C08G 64/06; C08G 64/0208; C08G 71/04; C09K 21/12; C09K 21/14; H01B 3/307
See application file for complete search history.

(56) References Cited

U.S. PATENT DOCUMENTS

| | | | | |
|---|---|---|---|---|
| 4,542,170 A | * | 9/1985 | Hall | .................... C08G 18/3889 521/107 |
| 6,312,810 B1 | | 11/2001 | Nozaki et al. | |
| 7,417,083 B2 | * | 8/2008 | Kosaka | ................ C08K 5/0066 252/609 |
| 8,691,897 B2 | * | 4/2014 | Brown | .................... C08L 75/04 524/115 |
| 8,969,446 B2 | * | 3/2015 | Brown | .................... C08L 75/04 524/100 |
| 2011/0082241 A1 | * | 4/2011 | Kaneda | ............... C08K 5/34928 524/100 |
| 2012/0065307 A1 | * | 3/2012 | Cogen | ................ C08K 5/34924 524/127 |
| 2013/0177771 A1 | * | 7/2013 | Chen | ........................ C08L 61/14 428/425.8 |

FOREIGN PATENT DOCUMENTS

| | | | | |
|---|---|---|---|---|
| EP | 0496122 A1 | 12/1991 | | |
| WO | 2006/121549 A1 | 11/2006 | | |
| WO | WO 2010012136 A1 | * 2/2010 | ............. | C08L 75/04 |
| WO | WO 2011019536 A1 | * 2/2011 | ............. | C08L 75/04 |
| WO | 2011/120225 A1 | 10/2011 | | |
| WO | 2012/067685 A1 | 5/2012 | | |

OTHER PUBLICATIONS https://www.lubrizol.com/LifeScience/Products/Carbothane.html, Dec. 2013.*

* cited by examiner

*Primary Examiner* — Satya Sastri
(74) *Attorney, Agent, or Firm* — Eryn Ace Fuhrer; Teresan W. Gilbert

(57) ABSTRACT

The present invention relates to flame retardant thermoplastic polyurethane (TPU) compositions, and more particularly to flame retardant thermoplastic polyurethane compositions comprising non-halogen flame retardants. The TPU compositions are useful for applications where high flame performance, and optionally low smoke properties, as well as high tensile strength are desirable, such as wire and cable applications, film applications, molding applications, and the like. This invention also relates to processes to produce the non-halogen flame retardant TPU compositions and processes to produce wire and cable jacketing from such compositions.

10 Claims, No Drawings

HALOGEN-FREE FLAME RETARDANT TPU WITH VERY HIGH LOI

CROSS REFERENCE TO RELATED APPLICATION

This application claims priority from PCT Application Serial No. PCT/US2013/044202 filed on Jun. 5, 2013, which claims the benefit of U.S. Provisional Application No. 61/660,869 filed on Jun. 18, 2012.

FIELD OF THE INVENTION

The present invention relates to flame retardant thermoplastic polyurethane (TPU) compositions, and more particularly to flame retardant thermoplastic polyurethane compositions comprising non-halogen flame retardants that have extremely high LOI values. It is also desirable to provide a TPU composition with the desired flame retardant properties and then also good mechanical properties such as good tensile strength and/or high flexibility. It is also desirable to provide a TPU composition with improved flame retardant characteristics such that the material will pass high level flame tests, have a high limiting oxygen index (LOI), and optionally also to possess low smoke properties. The TPU compositions are useful for applications where high flame performance, and optionally low smoke properties, as well as high tensile strength are desirable, such as wire and cable applications, film applications, molding applications, and the like. This invention also relates to processes to produce the described non-halogen flame retardant TPU compositions and processes to produce wire and cable jacketing from such compositions.

BACKGROUND OF THE INVENTION

Halogen additives, such as those based on fluorine, chlorine, and bromine, have been used to give flame retardant properties to TPU compositions. In recent years, certain end use applications that contain TPU specify that the TPU composition be halogen free. This has required TPU formulators to search for other flame retardants to replace the previously used halogen additives.

U.S. Pat. No. 6,777,466 assigned to Noveon IP Holding Co. discloses the use of melamine cyanurate as the only organic flame retardant additive in a thermoplastic polyurethane composition.

U.S. Pat. No. 5,837,760 assigned to Elastogram GmbH discloses a self-extinguishing flame retardant, thermoplastic polyurethane that contains one or more organic phosphonates and one or more organic phosphonates mixed with a melamine derivative.

U.S. Pat. No. 5,110,850 assigned to B.F. Goodrich Co. discloses halogen free flame retardant thermoplastic polymers where the sole flame retardant is a melamine that is free of melamine derivatives.

WO 2006/121549 assigned to Noveon, Inc. discloses a thermoplastic polyurethane containing a flame retardant combination including phosphinate compounds, phosphate compounds and a pentaerythritol and dipentaerythritol component.

WO 2012/067685 assigned to Lubrizol, Inc., discloses very similar thermoplastic polyurethane compositions. However the thermoplastic polyurethane compositions of the reference do not have high enough Limiting Oxygen Index (LOI) values and/or flame retardant properties to be useful in all applications.

Flame specifications for shipboard cables have become more stringent recently. There are currently no TPU-based products on the market that can pass the more demanding cable flame tests, such as CSA FT-4 for shipboard cables. Thus there is a need for TPU compositions and TPU-based products with improved high flame retardant properties, that would be suitable for such applications, while not impairing mechanical strength and processability of the TPU.

The LOI is a bench scale flame test used to assess the flammability of materials, including TPU compositions. It is a useful means of evaluating the relative flammability of various materials and can also help give some indication of how suitable a material may be for applications requiring high flame retardant properties. Thus there is a need for TPU compositions and TPU-based products with high LOI values, while not impairing mechanical strength and processability of the TPU.

SUMMARY OF THE INVENTION

It is an object of the invention to provide a non-halogen flame retardant TPU composition which provides improved flame retardant capabilities while still exhibiting good processing and mechanical properties such as tensile strength. It is an object of the invention to provide a flame retardant package for use with thermoplastic polyurethanes that provides extremely high LOI values and also good physical properties, such as tensile strength. It is also desirable for the flame retardant package to be at least essentially halogen free. In some embodiments it is also an object of the invention to provide elastomeric materials with unexpectedly very high LOI values while maintaining high elongation at break.

It is an object of the invention to provide a method for rendering a TPU composition flame retardant with extremely high LOI values and good tensile strength.

It is an object of the invention to provide a process for making a non-halogen flame retardant TPU composition which is suitable for flame retardant insulation and/or jacketing in wire and cable applications.

It is an object of the invention to provide a wire and cable jacket construction utilizing a flame retardant TPU composition with extremely high LOI values and good tensile strength.

In one aspect of the invention, a TPU composition is provided, which comprises at least one thermoplastic polycarbonate polyurethane polymer; a flame retardant package containing at least one organic phosphate compound; and a mixture of at least one phosphate, at least one phosphoric acid, and zinc oxide; and at least one stabilizer.

In another aspect, a wire and cable construction is produced by extruding an insulation layer of a non-conducting polymeric material onto at least one metal conductor; and extruding a flame retardant jacket to cover the insulated metal conductor. The jacket is a non-halogen flame retardant TPU composition of the present invention.

The invention provides a flame retardant thermoplastic polyurethane (TPU) composition comprising: (a) a polycarbonate TPU resin, (b) an aromatic phosphate, and (c) a phosphate salt. Component (a), the thermoplastic polyurethane resin, component (b), the aromatic phosphate, and component (c), the phosphate salt, are each essentially halogen-free. The TPU composition may further include (d) a boron phosphate.

In some embodiments component (a), the thermoplastic polycarbonate polyurethane resin, may be mixed with a polyester thermoplastic polyurethane resin, a polyether thermoplastic polyurethane resin, or a combination thereof. In some embodiments component (a), the polycarbonate TPU resin, includes an aromatic polycarbonate thermoplastic polyurethane resin, an aliphatic polycarbonate thermoplastic polyurethane resin, or a combination thereof.

In some embodiments component (b), the aromatic phosphate, includes bisphenol A diphosphate.

In some embodiments component (c), the phosphate salt, includes metal salts of phosphoric acid, phosphorous acid, hypophosphorous acid, amine phosphate, melamine phosphate, dimelamine phosphate, melamine pyrophosphate, dimelamine pyrophosphate, ammonium polyphosphate, melamine polyphosphate, ethylenediamine phosphate, melamine nitrilotrisphosphonate or a combination thereof. In some embodiments component (c), the phosphate salt, includes a polyphosphoric acid ammonium salt, a polyphosphoric acid melamine salt, or a combination thereof.

The invention further provides the described TPU composition where component (a), the polycarbonate TPU resin, comprises an aromatic polycarbonate thermoplastic polyurethane resin, an aliphatic polycarbonate thermoplastic polyurethane resin, or a combination thereof, and component (b), the aromatic phosphate, comprises bisphenol A diphosphate, and component (c), the phosphate salt, comprises a polyphosphoric acid ammonium salt, a polyphosphoric acid melamine salt, or a combination thereof.

The invention also provides the described TPU composition where component (a), the polycarbonate TPU resin, component (b), the aromatic phosphate, and component (c), the phosphate salt, are each essentially halogen-free.

In some embodiments, the described TPU composition includes component (a), the polycarbonate TPU resin, present in the composition from 30 to 90 percent by weight of the overall composition, and component (b), the aromatic phosphate, present in the composition from 1 to 20 percent by weight of the overall composition, and component (c), the phosphate salt, is present in the composition from 10 to 50 percent by weight of the overall composition.

The invention further provides for methods of increased the Limiting Oxygen Index (LOI) of a TPU composition. The method includes the steps of: (1) adding to a TPU resin, an aromatic phosphate and a phosphate salt. This results in a TPU composition with a LOI higher than that of the TPU resin itself. The polycarbonate TPU resin, the aromatic phosphate, and the phosphate salt, are each essentially halogen-free The invention also provides a method of making a TPU composition including the steps of mixing (a) a thermoplastic polycarbonate polyurethane resin, (b) an aromatic phosphate, and (c) a phosphate salt. The polycarbonate TPU resin, the aromatic phosphate, and the phosphate salt, are each essentially halogen-free The invention also provides an LOI booster additive package for a TPU composition. The additive package includes an aromatic phosphate and a phosphate salt. The invention also provides the use of an additive composition as an LOI booster for a polycarbonate TPU composition, where the additive composition comprises an aromatic phosphate and a phosphate salt. The polycarbonate TPU resin, the aromatic phosphate, and the phosphate salt, are each essentially halogen-free.

DETAILED DESCRIPTION OF THE INVENTION

The TPU compositions of the present invention comprise (a) at least one polycarbonate TPU polymer (which may also be referred to as a resin), (b) an aromatic phosphate flame retardant, and (c) a phosphate salt flame retardant. The compositions of the invention have a surprisingly high LOI, which make them particularly suitable for use in applications that have stringent flame retardancy specifications.

The TPU Component

The TPU polymer suitable for use in this invention is a polycarbonate TPU. However the compositions of the invention may also further include any conventional TPU polymer that is known to the art as long as the overall TPU polymer present is capable of imparting the desired mechanical and physical properties to the final flame retardant composition, in particular good tensile strength. The TPU polymer component of the present invention includes a polycarbonate TPU, generally in a major amount, but may also include one or more additional TPU polymers, which may be any conventional TPU polymer.

TPU are generally made by reacting a polyisocyanate with at least one diol chain extender, and optionally one or more hydroxyl terminated intermediates. U.S. Pat. No. 6,777,466 to Eckstein et al. provides detailed disclosure of processes to provide certain TPU polymers that may be utilized in embodiments of the present invention and is incorporated herein in its entirety.

Suitable polyisocyanates to make the TPU include aromatic diisocyanates such as 4,4'-methylenebis-(phenyl isocyanate) (MDI), m-xylene diisocyanate (XDI), phenylene-1,4-diisocyanate, naphthalene-1,5-diisocyanate, and toluene diisocyanate (TDI); as well as aliphatic diisocyanates such as isophorone diisocyanate (IPDI), 1,4-cyclohexyl diisocyanate (CHDI), decane-1,10-diisocyanate, and dicyclohexylmethane-4,4'-diisocyanate (H12MDI).

Mixtures of two or more polyisocyanates may be used. In some embodiments the polyisocyanate is MDI and/or H12MDI. In some embodiments the polyisocyanate may include MDI. In some embodiments the polyisocyanate may include H12MDI.

Suitable chain extenders to make the TPU include relatively small polyhydroxy compounds, for example lower aliphatic or short chain glycols having from 2 up to about 20 or from 2 up to 12, or from 2 up to 10 carbon atoms. Suitable examples include ethylene glycol, diethylene glycol, propylene glycol, dipropylene glycol, 1,4-butanediol (BDO), 1,6-hexanediol (HDO), 1,3-butanediol, 1,5-pentanediol, neopentylglycol, 1,4-cyclohexanedimethanol (CHDM), 2,2-bis[4-(2-hydroxyethoxy)phenyl]propane (HEPP) and hydroxyethyl resorcinol (HER), and the like, as well as mixtures thereof. In some embodiments the chain extenders are 1,4-butanediol and 1,6-hexanediol. Other glycols, such as aromatic glycols could be used, but in some embodiments the TPUs of the invention are not made using such materials.

In some embodiments the chain extender used to prepare the TPU is substantially free of, or even completely free of, 1,6-hexanediol. In some embodiments the chain extender used to prepare the TPU includes a cyclic chain extender. Suitable examples include CHDM, HEPP, HER, and combinations thereof. In some embodiments the chain extender used to prepare the TPU includes an aromatic cyclic chain extender, for example HEPP, HER, or a combination thereof. In some embodiments the chain extender used to prepare the TPU includes an aliphatic cyclic chain extender, for example CHDM. In some embodiments the chain extender used to prepare the TPU is substantially free of, or even completely free of aromatic chain extenders, for example aromatic cyclic chain extenders.

Suitable polyols (hydroxyl terminated intermediates), when present, include one or more hydroxyl terminated polyesters, one or more hydroxyl terminated polyethers, one or more hydroxyl terminated polycarbonates or mixtures thereof.

The TPU polymers suitable for use in the invention include TPU polymers made from one or more hydroxyl terminated polycarbonates. However as noted above, additional TPU polymers may also be present in combination with the polycarbonate TPU polymers described herein.

The hydroxyl terminated polycarbonate can be prepared by reacting a glycol with a carbonate. U.S. Pat. No. 4,131,731 discloses hydroxyl terminated polycarbonates and their preparation. Such polycarbonates are generally linear and have terminal hydroxyl groups with essential exclusion of other terminal groups. The essential reactants are glycols and carbonates. Suitable glycols are selected from cycloaliphatic and aliphatic diols containing 4 to 40, and preferably 4 to 12 carbon atoms, and from polyoxyalkylene glycols containing 2 to 20 alkoxy groups per molecular with each alkoxy group containing 2 to 4 carbon atoms. Diols suitable for use in the present invention include aliphatic diols containing 4 to 12 carbon atoms such as butanediol-1,4, pentanediol-1,4, neopentyl glycol, hexanediol-1,6,2,2,4-trimethylhexanediol-1,6, decanediol-1,10, hydrogenated dilinoleylglycol, hydrogenated dioleylglycol; and cycloaliphatic diols such as cyclohexanediol-1,3, dimethylolcyclohexane-1,4, cyclohexanediol-1,4, dimethylolcyclohexane-1,3, 1,4-endomethylene-2-hydroxy-5-hydroxymethyl cyclohexane, and polyalkylene glycols. The diols used in the reaction may be a single diol or a mixture of diols depending on the properties desired in the finished product.

Polycarbonate intermediates which are hydroxyl terminated are generally those known to the art and in the literature. Suitable carbonates are selected from alkylene carbonates composed of a 5 to 7 membered ring having the following general formula:

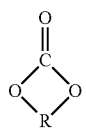

where R is a saturated divalent radical containing 2 to 6 linear carbon atoms. Suitable carbonates for use herein include ethylene carbonate, trimethylene carbonate, tetramethylene carbonate, hexamethylene carbonate, 1,2-propylene carbonate, 1,2-butylene carbonate, 2,3-butylene carbonate, 1,2-ethylene carbonate, 1,3-pentylene carbonate, 1,4-pentylene carbonate, 2,3-pentylene carbonate, and 2,4-pentylene carbonate.

Also, suitable herein are dialkyl carbonates, cycloaliphatic carbonates, and diaryl carbonates. The dialkyl carbonates can contain 2 to 5 carbon atoms in each alkyl group and specific examples thereof are diethyl carbonate and dipropyl carbonate. Cycloaliphatic carbonates, especially dicycloaliphatic carbonates, can contain 4 to 7 carbon atoms in each cyclic structure, and there can be one or two of such structures. When one group is cycloaliphatic, the other can be either alkyl or aryl. On the other hand, if one group is aryl, the other can be alkyl or cycloaliphatic. Preferred examples of diaryl carbonates, which can contain 6 to 20 carbon atoms in each aryl group, are diphenyl carbonate, ditolyl carbonate, and dinaphthyl carbonate.

The reaction is carried out by reacting a glycol with a carbonate, preferably an alkylene carbonate in the molar range of 10:1 to 1:10, but preferably 3:1 to 1:3 at a temperature of 100° C. to 300° C. and at a pressure in the range of 0.1 to 300 mm of mercury in the presence or absence of an ester interchange catalyst, while removing low boiling glycols by distillation.

More specifically, the hydroxyl terminated polycarbonates are prepared in two stages. In the first stage, a glycol is reacted with an alkylene carbonate to form a low molecular weight hydroxyl terminated polycarbonate. The lower boiling point glycol is removed by distillation at 100° C. to 300° C., preferably at 150° C. to 250° C., under a reduced pressure of 10 to 30 mm Hg, preferably 50 to 200 mm Hg. A fractionating column is used to separate the by-product glycol from the reaction mixture. The by-product glycol is taken off the top of the column and the unreacted alkylene carbonate and glycol reactant are returned to the reaction vessel as reflux. A current of inert gas or an inert solvent can be used to facilitate removal of by-product glycol as it is formed. When amount of by-product glycol obtained indicates that degree of polymerization of the hydroxyl terminated polycarbonate is in the range of 2 to 10, the pressure is gradually reduced to 0.1 to 10 mm Hg and the unreacted glycol and alkylene carbonate are removed. This marks the beginning of the second stage of reaction during which the low molecular weight hydroxyl terminated polycarbonate is condensed by distilling off glycol as it is formed at 100° C. to 300° C., preferably 150° C. to 250° C. and at a pressure of 0.1 to 10 mm Hg until the desired molecular weight of the hydroxyl terminated polycarbonate is attained. Molecular weight (Mn) of the hydroxyl terminated polycarbonates can vary from about 500 to about 10,000 but in a preferred embodiment, it will be in the range of 500 to 2500.

In some embodiments the polycarbonate TPU polymer of the invention includes a TPU made by reacting: (i) MDI, XDI, H12MDI, or some combination thereof; (ii) BDO, HDO, CHDM, or some combination thereof; and (iii) poly(trimethylene carbonate)glycol, poly(tetramethylene carbonate)glycol, poly(hexamethylene carbonate)glycol, or some combination thereof.

In some embodiments the polycarbonate TPU polymer of the invention includes a TPU made by reacting: (i) MDI; (ii) BDO, HDO, CHDM, or some combination thereof; and (iii) poly(trimethylene carbonate)glycol, poly(tetramethylene carbonate)glycol, poly(hexamethylene carbonate)glycol, or some combination thereof. In some embodiments the polycarbonate TPU polymer of the invention includes a TPU made by reacting: (i) H12MDI; (ii) BDO, HDO, CHDM, or some combination thereof; and (iii) poly(trimethylene carbonate)glycol, poly(tetramethylene carbonate)glycol, poly(hexamethylene carbonate)glycol, or some combination thereof.

In some embodiments the polycarbonate TPU polymer of the invention includes a TPU made by reacting: (i) MDI, XDI, H12MDI, or some combination thereof; (ii) BDO; and (iii) poly(trimethylene carbonate)glycol, poly(tetramethylene carbonate) glycol, poly(hexamethylene carbonate)glycol, or some combination thereof. In some embodiments the polycarbonate TPU polymer of the invention includes a TPU made by reacting: (i) MDI, XDI, H12MDI, or some combination thereof; (ii) HDO; and (iii) poly(trimethylene carbonate)glycol, poly(tetramethylene carbonate)glycol, poly(hexamethylene carbonate)glycol, or some combination thereof.

In some embodiments the polycarbonate TPU polymer of the invention includes a TPU made by reacting: (i) MDI, XDI, H12MDI, or some combination thereof; (ii) BDO, HDO, CHDM, or some combination thereof; and (iii) poly (tetramethylene carbonate)glycol. In some embodiments the polycarbonate TPU polymer of the invention includes a TPU made by reacting: (i) MDI, XDI, H12MDI, or some combination thereof; (ii) BDO, HDO, CHDM, or some combination thereof; and (iii) poly(hexamethylene carbonate)glycol.

As noted above, one or more additional TPU may be used in combination with the polycarbonate TPU polymer. These TPU polymers can include one or more additional polycarbonate TPU polymers, one or more polyether TPU polymers, and/or polyester TPU polymers.

The polyether TPU polymers and/or polyester TPU polymers suitable for use in the present invention may be prepared using any of the polyisocyanate with at least one diol chain extender, and optionally one or more hydroxyl terminated intermediates.

Suitable hydroxyl terminated polyester intermediates include linear polyesters having a number average molecular weight (Mn) of from about 500 to about 10,000, from about 700 to about 5,000, or from about 700 to about 4,000, and generally have an acid number generally less than 1.3 or less than 0.5. The molecular weight is determined by assay of the terminal functional groups and is related to the number average molecular weight. The polyester intermediates may be produced by (1) an esterification reaction of one or more glycols with one or more dicarboxylic acids or anhydrides or (2) by transesterification reaction, i.e., the reaction of one or more glycols with esters of dicarboxylic acids. Mole ratios generally in excess of more than one mole of glycol to acid are preferred so as to obtain linear chains having a preponderance of terminal hydroxyl groups. Suitable polyester intermediates also include various lactones such as polycaprolactone typically made from ε-caprolactone and a bifunctional initiator such as diethylene glycol. The dicarboxylic acids of the desired polyester can be aliphatic, cycloaliphatic, aromatic, or combinations thereof. Suitable dicarboxylic acids which may be used alone or in mixtures generally have a total of from 4 to 15 carbon atoms and include: succinic, glutaric, adipic, pimelic, suberic, azelaic, sebacic, dodecanedioic, isophthalic, terephthalic, cyclohexane dicarboxylic, and the like. Anhydrides of the above dicarboxylic acids such as phthalic anhydride, tetrahydrophthalic anhydride, or the like, can also be used. Adipic acid is a preferred diacid. The glycols which are reacted to form a desirable polyester intermediate can be aliphatic, aromatic, or combinations thereof, including any of the glycol described above in the chain extender section, and have a total of from 2 to 20 or from 2 to 12 carbon atoms. Suitable examples include ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and mixtures thereof.

Suitable hydroxyl terminated polyether intermediates include polyether polyols derived from a diol or polyol having a total of from 2 to 15 carbon atoms, in some embodiments an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly(ethylene glycol) comprising ethylene oxide reacted with ethylene glycol, poly(propylene glycol) comprising propylene oxide reacted with propylene glycol, poly(tetramethylene glycol) comprising water reacted with tetrahydrofuran (PTMEG). In some embodiments the polyether intermediate includes PTMEG. Suitable polyether polyols also include polyamide adducts of an alkylene oxide and can include, for example, ethylenediamine adduct comprising the reaction product of ethylenediamine and propylene oxide, diethylenetriamine adduct comprising the reaction product of diethylenetriamine with propylene oxide, and similar polyamide type polyether polyols. Copolyethers can also be utilized in the current invention. Typical copolyethers include the reaction product of THF and ethylene oxide or THF and propylene oxide. These are available from BASF as Poly THF B, a block copolymer, and poly THF R, a random copolymer. The various polyether intermediates generally have a number average molecular weight ($M_n$) as determined by assay of the terminal functional groups which is an average molecular weight greater than about 700, such as from about 700 to about 10,000, from about 1000 to about 5000, or from about 1000 to about 2500. A particular desirable polyether intermediate is a blend of two or more different molecular weight polyethers, such as a blend of 2000 $M_n$ and 1000 $M_n$ PTMEG.

In some embodiments the TPU is made by reacting the polyisocyanate shown above with the chain extender, with or without any polyol being present. The reactants to make the rigid TPU may be reacted together in a "one shot" polymerization process wherein all of the components, including reactants are added together simultaneously or substantially simultaneously to a heated extruder and reacted to form the TPU polymer. The reaction temperature utilizing urethane catalyst are generally from about 175° C. to about 245° C., and in some embodiments from about 180° C. to about 220° C. In some embodiments the equivalent ratio of the diisocyanate to the total equivalents of the hydroxyl terminated intermediate and the diol chain extender is generally from about 0.95 to about 1.05, desirably from about 0.97 to about 1.03, or from about 0.98 to about 1.01.

The desired TPU resin used in the TPU compositions of the invention is generally made from the above-noted intermediates with a polyisocyanate, along with an extender glycol. In some embodiments the reaction is carried out in a so-called one-shot process or simultaneous co-reaction of the hydroxyl-terminated intermediate, diisocyanate, and extender glycol to produce a high molecular weight linear TPU polymer. The preparation of the macroglycol is generally well known to the art and to the literature and any suitable method may be used. The weight average molecular weight (Mw) of the TPU polymer may generally be about 80,000 to 800,000, or even from about 90,000 to about 450,000 Daltons. The equivalent weight amount of diisocyanate to the total equivalent weight amount of hydroxyl containing components, that is the hydroxyl terminated intermediate, and chain extender glycol, may be from about 0.95 to about 1.10, or from about 0.96 to about 1.02, or from about 0.97 to about 1.005. In one embodiment the TPU is substantially free of crosslinking and may even be completely free of any measurable crosslinking.

In one embodiment the one-shot polymerization process generally occurs in situ, wherein a simultaneous reaction occurs between the components, that is, the one or more intermediates, the one or more polyisocyanates, and the one or more chain extenders. The reaction is generally initiated at temperatures of from about 100° C. to about 120° C. Inasmuch as the reaction is exothermic, the reaction temperature generally increases to about 220° C.-250° C. In one exemplary embodiment, the TPU polymer may be pelletized following the reaction. The flame retardant components described herein, as well as any additional additives, may be incorporated during making the TPU and/or with the TPU polymer pellets to form the TPU compositions of the invention in a subsequent process. The optional additives may be incorporated during making the TPU and/or with the TPU polymer pellets to form the TPU compositions of the invention.

In some embodiments the TPU resin present in the TPU compositions of the invention include a polycarbonate TPU resin, and is optionally mixed with a polyester TPU resin, a polyether TPU resin, or a combination thereof. In some embodiments the TPU resin is a polycarbonate TPU resin.

In some embodiments the TPU resin present in the TPU compositions of the invention include an aromatic polycarbonate TPU resin, an aliphatic polycarbonate TPU resin, or a combination thereof. In some embodiments the TPU resin is an aromatic polycarbonate TPU resin.

The polycarbonate TPU resin component may be present in an amount from 30 to 90 weight percent of the overall TPU composition, in other embodiments from 40 to 80, or from 40 to 70, or from 45 to 65, or from 45 to 60 weight percent of the overall TPU composition.

The Aromatic Phosphate Flame Retardant

The compositions of the invention include an aromatic phosphate flame retardant. Suitable examples include monophosphates with aromatic groups, di phosphates with aromatic groups, triphosphates with aromatic groups, or any combination thereof. In some embodiments the aromatic phosphate flame retardant includes one or more diphosphates with aromatic groups. Examples of such materials include bisphenol A diphosphate.

In some embodiments the aromatic phosphate flame retardant, comprises one or more compounds represented by formula (I), formula (II), formula (III), or combinations thereof:

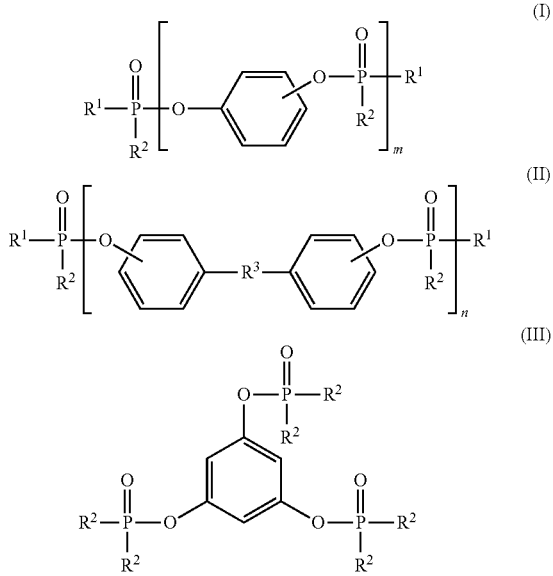

wherein: in each of the formulas (I), (II), and (III), each $R^1$ is independently a hydrocarbon group or a hydrocarbonoxy group; $R^3$ is a hydrocarbylene group; each $R^2$ is independently a hydrocarbon group or a hydrocarbonoxy group; and m and n are integers from 1 to 30.

In some embodiments the aromatic phosphate flame retardant, includes one or more compounds represented by formula (I), optionally in combination with one or more compounds represented by formula (II) and/or formula (III). In some embodiments the aromatic phosphate flame retardant, comprises one or more compounds represented by formula (II), optionally in combination with one or more compounds represented by formula (I) and/or formula (III). In some embodiments the aromatic phosphate flame retardant, includes one or more compounds represented by formula (III), optionally in combination with one or more compounds represented by formula (I) and/or formula (II).

The compositions of the invention include an aromatic phosphate flame retardant. Suitable examples include monophosphates with aromatic groups, di phosphates with aromatic groups, triphosphates with aromatic groups, or any combination thereof. In some embodiments the aromatic phosphate flame retardant includes one or more diphosphates with aromatic groups. Examples of such materials include bisphenol A diphosphate.

In some embodiments the aromatic phosphate flame retardant, includes one or more compounds represented by formula (II), where n is 1 and each $R^1$ and $R^2$ is a hydrocarbon group containing an aromatic ring or a hydrocarbonoxy group containing an aromatic ring.

In some embodiments the aromatic phosphate flame retardant, includes one or more compounds represented by formula (II), where n is 1, where $R^1$ and $R^2$ are all benzene groups (-AR, where AR is a benzyl ring), or all phenyl groups (—O-AR, where AR is a benzyl ring), and where $R^3$ is a >C(CH$_3$)(CH$_3$) group, or a —O— group. In some embodiments the aromatic phosphate flame retardant, includes one or more compounds represented by formula (II), where n is 1, where $R^1$ and $R^2$ are all benzene groups (-AR, where AR is a benzyl ring), and where $R^3$ is a >C(CH$_3$)(CH$_3$) group. In some embodiments the aromatic phosphate flame retardant, includes one or more compounds represented by formula (II), where n is 1, where $R^1$ and $R^2$ are all phenyl groups (—O-AR, where AR is a benzyl ring), and where $R^3$ is a >C(CH$_3$)(CH$_3$) group.

Suitable examples of compounds that may be used as, or used in combination with, the aromatic phosphate flame retardant of the invention include triaryl phosphate, polyaryl phosphate esters, such as triphenyl phosphate, tricresyl phosphate, trixylyl phosphate, cresyl diphenyl phosphate, diphenyl xylyl phosphate, 2-biphenyldiphenyl phosphate, alkylated polyaryl phosphate esters such as butylated triphenyl phosphate, t-butylphenyl diphenyl phosphate, bis(t-butyl)phenyl phosphate, tris(t-butylphenyl)phosphate, tris (2,4-di-t-butylphenyl)phosphate, isopropylated triphenyl phosphates, isopropylated t-butylated triphenyl phosphates, t-butylated triphenyl phosphates, isopropylphenyl diphenyl phosphate, bis(isopropylphenyl) phenyl phosphate (3,4-di-isopropylphenyl)diphenyl phosphate, tris(isopropylphenyl) phosphate, (1-methyl-1-phenylethyl)phenyl diphenyl phosphate, nonylphenyl diphenyl phosphate, 4-[4-hydroxyphenyl(propane-2,2-diyl)]phenyl diphenyl phosphate, 4-hydroxyphenyl diphenyl phosphate, resorcinol bis(diphenyl phosphate), bisphenol A bis(diphenyl phosphate), bis(ditolyl)isopropylidenedi-p-phenylene bis(phosphate), O,O,O,O'-tetrakis(2,6-dimethylphenyl)-O,O'-m-phenylene bisphosphate, alkylaryl phosphate esters such as 2-ethylhexyl diphenyl phosphate, isodecyl diphenyl phosphate, diethyl phenethylamidophosphate, diisodecyl phenyl phosphate, dibutyl phenyl phosphate, methyl diphenyl phosphate, butyl diphenyl phosphate, diphenyl octyl phosphate, isoctyl diphenyl phosphate, isopropyl diphenyl phosphate, diphenyl lauryl phosphate, tetradecyl diphenyl phosphate, cetyl diphenyl phosphate, tar acids cresylic diphenyl phosphates, trialkyl phosphate esters, such as triethyl phosphate, tributyl phosphate, tri(butoxyethyl)phosphate, 3-(dimethylphosphono)propionic acid methylamide, pentaerythritol cyclic phosphate, and combinations thereof.

In one embodiment aromatic phosphate flame retardant includes a triphenyl phosphate, and a phosphorus based flame retardant, namely NcendX® P-30 (bisphenol A bis diphenyl phosphate) from Albermarle Corporation and combinations thereof.

In some embodiments the aromatic phosphate flame retardant is melamine free and/or melamine derivative compound free.

The aromatic phosphate flame retardant component may be present in an amount from 1 to 25 weight percent of the overall TPU composition, in other embodiments from 1 to 20, or from 5 to 15, or from 1 to 10, or from 2 to 10, or from 4 to 10, or from 5 to 10, or even from 5 to 7 weight percent of the overall TPU composition.

The Phosphate Salt Flame Retardant

The compositions of the invention include a phosphate salt flame retardant. Suitable examples include metal salts of phosphoric acid, phosphorous acid, hypophosphorous acid, amine phosphate, melamine phosphate, dimelamine phosphate, melamine pyrophosphate, dimelamine pyrophosphate, ammonium polyphosphate, melamine polyphosphate, ethylenediamine phosphate, melamine nitrilotrisphosphonate or a combination thereof.

In some embodiments the phosphate salt flame retardant, comprises a polyphosphoric acid ammonium salt, a polyphosphoric acid melamine salt, or a combination thereof.

Suitable examples include a nitrogen containing phosphate salt, a polyphosphoric acid ammonium salt, a polyphosphoric acid melamine salt, and even a mixture of piperazine pyrophosphate, phosphoric acid, and zinc oxide.

In some embodiments the phosphate salt flame retardant may be described as a mixture of an organic phosphate in combination with an organic phosphoric acid compound and optionally with a zinc oxide. It is not believed that the mixture reacts with the other components in the flame retardant package. In such mixture the weight ratio of phosphate compound to phosphoric acid compound may be from 1:0.01 to 1:2, and in another embodiment from 1:0.01 to 1:2, and in another embodiment from 1:0.07 to 1:2.

The phosphate compound in the mixture may include piperazine pyrophosphate, piperazine polyphosphate, or any combinations thereof.

The phosphoric acid compounds in the mixture may include phosphoric acid, melamine pyrophosphate, melamine polyphosphate, melamine phosphate, or any combinations thereof.

In one embodiment the phosphoric acid is melamine phosphate.

In one embodiment the phosphoric acid compound in the mixture excludes cyanurate, cyanuric acid and each of their derivatives.

In some embodiments the phosphate salt flame retardant further comprises a zinc oxide component. The zinc oxide is not believed to react with the other components of the phosphate salt flame retardant however in some embodiments it is contemplated that the zinc oxide, when present, does not react appreciably with the other components in the phosphate salt flame retardant.

The phosphate salt flame retardant may be present in an amount from 15 to 50 weight percent of the overall TPU composition, in other embodiments from 20 to 50, or from 25 to 45, or from 30 to 45, or from 30 to 40, or even from 35 to 40 weight percent of the overall TPU composition.

In one embodiment the TPU composition of the invention includes an aromatic polycarbonate thermoplastic polyurethane resin, bisphenol A diphosphate, and mixture of a polyphosphoric acid ammonium salt, a polyphosphoric acid melamine salt, and zinc oxide.

Additional Components

The TPU compositions of the invention may also include one or more additional components.

In some embodiments the additional component is an additional flame retardant. This additional flame retardant may include a boron phosphate flame retardant, a magnesium oxide, a dipentaerythritol, a polytetrafluoroethylene (PTFE) polymer, or any combination thereof. In some embodiments this additional flame retardant may include a boron phosphate flame retardant, a magnesium oxide, a dipentaerythritol, or any combination thereof. A suitable example of a boron phosphate flame retardant is BUDIT 326, commercially available from Budenheim USA, Inc.

When present, the additional flame retardant component may be present in an amount from 0 to 10 weight percent of the overall TPU composition, in other embodiments from 0.5 to 10, or from 1 to 10, or from 0.5 or 1 to 5, or from 0.5 to 3, or even from 1 to 3 weight percent of the overall TPU composition.

The TPU compositions of the invention may also include additional additives, which may be referred to as a stabilizer. The stabilizers may include antioxidants such as phenolics, phosphites, thioesters, and amines, light stabilizers such as hindered amine light stabilizers and benzothiazole UV absorbers, and other process stabilizers and combinations thereof. In one embodiment the preferred stabilizer is Irganox 1010 from Ciba-Geigy Corp. and Naugard 445 from Chemtura. The stabilizer is used in the amount from about 0.1 weight percent to about 5 weight percent, in another embodiment from about 0.1 weight percent to about 3 weight percent, and in another embodiment from about 0.5 weight percent to about 1.5 weight percent of the TPU composition.

In addition, various conventional inorganic flame retardant components may be employed in the flame retardant TPU composition. Suitable inorganic flame retardants include any of those known to one skilled in the art, such as metal oxides, metal oxide hydrates, metal carbonates, ammonium phosphate, ammonium polyphosphate, calcium carbonate, antimony oxide, clay, mineral clays including talc, kaolin, wollastonite, nanoclay, montmorillonite clay which is often referred to as nanoclay, and mixture thereof. In one embodiment the flame retardant package includes talc. The talc in the flame retardant package promotes properties of high LOI. The inorganic flame retardants may be used in the amount from 0 to about 30 weight percent, from about 0.1 weight percent to about 20 weight percent, in another embodiment about 0.5 weight percent to about 15 weight percent of the total weight of the TPU composition.

For some applications, optional additives, which are not flame retardants, may be used in the TPU compositions of the invention. The additives include colorants, antioxidants (including phenolics, phosphites, thioesters, and/or amines), antiozonates, stabilizers, inert fillers, lubricants, inhibitors, hydrolysis stabilizers, light stabilizers, hindered amines light stabilizers, benzotriazole UV absorber, heat stabilizers, stabilizers to prevent discoloration, dyes, pigments, inorganic and organic fillers, reinforcing agents and combinations thereof. The additives are used in an effective amount customary for these substances. The non-flame retardants additives may be used in amounts of from about 0 to about 30 weight percent, in one embodiment from about 0.1 to about 25 weight percent, and in another embodiment about 0.1 to about 20 weight percent of the total weight of the TPU composition. For this purpose the aromatic phosphate flame retardant and the a phosphate salt flame retardant, as well as the optional flame retardant additives and/or optional additives, can be incorporated into the components of, or into the reaction mixture for, the preparation of the TPU resin, or after making the TPU resin. In another process, all the materials can be mixed with the TPU resin and then melted or they can be incorporated directly into the melt of the TPU resin.

In one embodiment the overall TPU composition is substantially halogen-free and in another embodiment the TPU composition is halogen free.

INDUSTRIAL APPLICATION

The TPU resin, aromatic phosphate flame retardant, and phosphate salt flame retardant, along with any optional components that may be present, may be compounded together by any means known to those skilled in the art. If a pelletized TPU resin is used, the polymer may be melted at a temperature of about 150° C. to 230° C., preferably from about 160-190° C., and more preferably from about 170-180° C. The particular temperature used will depend on the particular TPU resin used, as is well understood by those skilled in the art. The TPU resin, aromatic phosphate flame retardant, and phosphate salt flame retardant, as well as any optional additives that may be present, may be blended to form an intimate physical mixture. Blending can occur in any commonly used mixing device able to provide shear mixing, but a twin screw extruder having multiple heat zones with multiple feeding ports is preferably used for the blending and melting process.

The TPU resin, aromatic phosphate flame retardant, and phosphate salt flame retardant, along with any optional components that may be present, may be pre-blended before adding to the compounding extruder or they may be added or metered into the compounding extruder in different streams and in different zones of the extruder.

In another embodiment, the TPU resin is not pelletized prior to the addition of the aromatic phosphate flame retardant and the phosphate salt flame retardant. Rather, the process for forming the TPU composition of the invention is a continuous in situ process. The ingredients to form the TPU resin are added to a reaction vessel, such as a twin screw extruder as set forth above. After formation of the TPU resin, the aromatic phosphate flame retardant, and phosphate salt flame retardant, and any optional components that may be desired, may be added or metered into the extruder in different streams and/or in different zones of the extruder in order to form a thermoplastic polyurethane composition. The f the aromatic phosphate flame retardant, and phosphate salt flame retardant, and any optional components that may be desired, may be added in a quantity sufficient to impart at least one predetermined flame retardant characteristic to the composition, as set forth in further detail below.

The resultant TPU composition may exit the extruder die in a molten state and be pelletized and stored for further use in making finished articles. The finished articles may comprise injection-molded parts. Other finished articles may comprise extruded profiles. The TPU composition may be utilized as a cable jacket as set forth in further detail below.

Thermoplastic polyurethanes are generally valued in end use applications because of their abrasion and wear resistance, low temperature flexibility, hydrolytic stability, toughness and durability, ease of processing, tensile strength and other attributes. When additives, such as flame retardants, are present in a TPU composition, there may be some reduction in the desired material properties. The flame retardant package should thus impart the desired flame retardancy, and in some embodiments low smoke properties, without overly sacrificing other material properties, such as tensile strength and in some embodiments percent elongation at break. In the present invention the result is a TPU composition with an extremely high LOI.

Mechanical properties of flame retardant plastics may be very important for performance of end products. Reference standards for electrical wire and cables such as UL 1581 or similar requires certain minimum physical properties for cable jacketing materials. Elongation at Break and Tensile strength are examples of physical properties specified for cable jacket material. Generally jacketing material requires having elongation at break higher than 200% and/or tensile strength higher than 1500 psi, or even 2000 psi, or even at least 2300 or 2400 psi. For non-flame retardant plastics mechanical properties requirements are easily met but when it is desired to improve flammability performance, specifically by requiring an minimum LOI, certain mechanical properties may be severely affected. Generally products with very high LOI have elongation at break lower than 100% and more commonly even less than 50%. Tensile strength of highly flame retardant plastics suitable for cable jackets are generally less than 1500 psi. Moreover products with very high LOI are generally based on halogen chemistry commonly fluorine based and sometimes chlorine based. There is no solution available in market to inventor's knowledge that can provide these high LOI demonstrated by the invention while still maintaining an elongation at break higher than 150% or even 200%. The present invention provides unexpectedly very high LOI and in some embodiments can do so while maintaining very high tensile strength, and then even high elongation at break. The ultimate tensile strength and elongation break of the TPU composition is measured according to ASTM D412.

Another important property valued for cable jacket application is flexibility. Flexibility can be characterized by the flexural modulus. Lower the flexural modulus better is flexibility. TPUs generally have flexural modulus lower than 20,000 psi whereas other non-TPU products specifically highly flame retardant products have flexural modulus 3 to 5 times higher than that of TPUs. The present invention features highly flame retardant product with flexibility typical of TPUs.

Highly flame retardant plastics materials many times suffer from poor processing characteristics and poor surface finish of extruded product. Poor surface finish or processing may be results of thermally instable flame retardant additives and/or very high level of additives used. Also highly flame retardant products are generally completely opaque. The present invention provides highly flame retardant product with excellent processability. The present invention products are thermally stable at TPU processing temperatures. Furthermore extruded films of present invention at 30 mil thickness features translucence appearance and provides partial visibility across the film. Translucency and excellent surface finish is evidence of good dispersion of additives and processability of present invention.

The TPU compositions may be extruded into the jacket from previously made TPU composition. Usually, the TPU composition is in the form of pellets for easy feeding into the extruder. This method is the most common since the TPU composition is not normally made by the same party that makes the wire and cable construction. However, in accordance with an embodiment of the invention, the wire and cable jacket could be extruded directly from the compounding extruder without going through the separate step of pelletizing the flame retardant TPU composition.

As noted above, one flame retardant characteristic conferred on the TPU composition is improved limiting oxygen index (LOI). The limiting oxygen index (LOI) can be linearly related to flame resistance. That is, the higher the LOI, the better the flame resistance. The LOI is the minimum percentage of oxygen which allows a sample to sustain combustion under specified conditions in a candle-like fashion, and thus may be considered to measure the ease of extinction of a sample. The LOI test has been formalized as ASTM D2863. In many applications, the flame retardant TPU must meet a certain LOI standard. In general, TPU compositions with LOI values higher than 33 are commercially useful, however they are limited as to what applications they may be used in. In one embodiment of the present invention, the flame retardant TPU composition has an LOI of greater than 35, greater than 38, greater than 40, or even greater than 50. In some embodiments the LOI of the TPU compositions of the present invention is from 35 to 70, 38 to 70, 40 to 70, 40 to 60, or even 50 to 60 or 50 to 70. These extremely high LOI values may be achieved by the compositions of the present invention even though the primary components of the compositions are essentially halogen free, and in other embodiments completely halogen free. Indeed in some embodiments the overall compositions of the invention are essentially halogen free, or even completely halogen free.

Many customers require an LOI of at least 35, or even 38, for cables that are placed in trays in buildings and even higher requires for other application, like cables placed in ships. These requirements of high LOI and/or flame retardancy has precluded the use of TPU in such applications. The present invention provides TPU compositions with extremely high LOI values making them suitable for such applications. In still other embodiments these very high LOI requirements are combined with a need for very high tensile strength, for example at least 2000 psi as measured by ASTM D412. In some embodiments the present invention provides TPU compositions with extremely high LOI values in combination with very high tensile strength, making them suitable for such applications. In still other embodiments these very high LOI requirements are combined with a need for very high tensile strength and/or high elongation at break, for example a tensile strength of at least 2000 psi and/or a percent elongation at break of at least 150%, as measured by ASTM D412. In some embodiments the present invention provides TPU compositions with extremely high LOI values in combination with very high tensile strength and/or percent elongation at break, making them suitable for such applications.

There are many flammability tests used for classifying materials with respect to flame resistance, such as UL subject 94 vertical (UL-94 V) burning test, NFPA 701, and UL-1581, as well as others. Each of these tests was designed to address problems presented by a specific product design and application, which could not be predicted by other test procedures. Thus, if a product passed one type of flame test, it does not mean it would pass also a flame test done at a higher temperature, a different geometry, a different thickness, or in the final construction of the article. Another flame retardant characteristic is measured by the Underwriters Laboratories Vertical Burn Standard—UL 94(UL-94). Embodiments of the present invention provide a flame retardant TPU composition able to obtain a non-dripping V0 rating on UL-94 test at a thickness as low as 75 mils. As the UL rating should always be reported with the thickness, an exemplary embodiment achieves a V0 rating at a thickness of about 75 mils and does not drip. In some embodiments the flame retardant TPU composition of the invention achieves a V0 with non-dripping properties. In some of the embodiments the composition is present at a thickness of 50 to 100 mils, 65 to 85 mils, or even about 75 mils.

Another flame retardant characteristic is low smoke density as measured by ASTM E 662. In some embodiments the present invention provides a flame retardant TPU composition able to obtain a smoke density ($D_S$) at 1.5 min<100 and in another embodiment $D_S$ at 4 min<200 in either flaming or non-flaming mode. It is very desirable to have low smoke properties especially in transportation applications.

The TPU compositions, because of their flame retardant properties, abrasion resistance and good tensile strength, are particularly suited for use as insulation and/or jacketing for electrical conductors in wire and cable construction applications, such as jacketing for armored cable, industrial robotic equipment, non-metallic sheath cable, deep well pump cables and other multiple conductor assemblies. The fire performance of a wire and cable construction can be influenced by many factors, with the jacket being one factor. The flammability of the insulation material can also affect the fire performance of the wire and cable construction, as well as other inner components, such as paper wrappings, fillers, and the like. A typical wire and cable construction will have at least one and typically will have multiple electrical conductors, usually from 2 to 8 conductors, such as copper wires. Each conductor will typically be coated, normally by extrusion, with a thin layer of polymeric insulation compound which can be polyvinyl chloride, polyethylene, cross-linked polyethylene, fluorocarbon polymers, and the like. The insulated conductors may be wrapped with metal, a fiberglass or other non-flammable textile. The multiple conductors are then encased in a jacket material (i.e., the TPU composition of this invention) to protect the electrical conductors. It is necessary for this jacket material to be, flame resistant in case a fire occurs.

Embodiments of wire and cable constructions are made by extruding the TPU composition onto a bundle of insulated conductors to form a jacket around the insulated conductors. The thickness of the jacket depends on the requirements of the desired end use application. Typical thickness of the jacket is from about 0.010 to 0.200 inch and more typical from about 0.020 to about 0.060 inch. The thinnest jacket is typically about 20 to 30 mils (0.508 to 0.762 mm) and therefore, a minimum LOI of 30 is useful, but LOI values of at least 35, 38, or even 40 are desirable at that thickness to make the jacket suitable for use in tray cable burn applications with high LOI and/or flame retardancy requirements.

The invention will be better understood by reference to the following examples.

EXAMPLES

The invention will be further illustrated by the following examples, which sets forth particularly advantageous embodiments. While the examples are provided to illustrate the invention, they are not intended to limit it Example Set A A set of TPU compositions is prepared using a polyether TPU, a polycarbonate TPU, or a combination thereof. The compositions include and exclude various other additives to show the benefits of the present invention. The same additive package listed in the table is used in each example. The additive package includes multiple stabilizer additives and talc. The formulations of the examples are summarized in Table 1 below, where all values are percent by weight. The results obtained from these examples are summarized in Table 2 below.

TABLE 1

| Component | Comp Ex A-1 | Comp Ex A-2 | Comp Ex A-3 | Comp Ex A-4 | Comp Ex A-5 | Inv Ex A-6 | Inv Ex A-7 | Inv Ex A-8 | Inv Ex A-9 |
|---|---|---|---|---|---|---|---|---|---|
| Polyether TPU | 53.7 | 51.9 | 50.6 | 44.7 | 35.7 | | | | |
| Polycarbonate TPU | | | | 10 | 20 | 50.7 | 47.7 | 47.7 | 49.2 |
| Aromatic Phosphate | 6.0 | 5.8 | 5.6 | 5.0 | 4.0 | 7.0 | 7.0 | 7.0 | 7.0 |
| Phosphate Salt | 37.0 | 37.0 | 40.0 | 37.0 | 37.0 | 37.0 | 37.0 | 37.0 | 40.0 |
| Boron Phosphate | | 2.0 | | | | 2.0 | | | |
| Magnesium Oxide | | | | | | | 5.0 | | |
| Dipentaerythritol | | | | | | | | 5.0 | |
| PTFE Polymer | | | 0.5 | | | | | | 0.5 |
| Additive Package | 3.3 | 3.3 | 3.3 | 3.3 | 3.3 | 3.3 | 3.3 | 3.3 | 3.3 |

TABLE 2

| Test Result[1] | Comp Ex A-1 | Comp Ex A-2 | Comp Ex A-3 | Comp Ex A-4 | Comp Ex A-5 | Inv Ex A-6 | Inv Ex A-7 | Inv Ex A-8 | Inv Ex A-9 |
|---|---|---|---|---|---|---|---|---|---|
| LOI | 38 | 40 | 44 | 42 | 42 | 55 | 55 | 64 | 62 |
| UL 94 Rating (0.075") | V-0 | V-0 | V-0 | V-0 | V-0 | V-0 | V-0 | V-0 | V-0 |
| Tensile Strength (psi) | 3270 | 1940 | 1760 | 2940 | 1920 | 2550 | 2490 | 2420 | 2120 |
| Break Elongation (%) | 376 | 218 | 179 | 357 | 200 | 283 | 35.7 | 37.4 | 55.9 |

[1]LOI is measured by ASTM D2863. The UL 94 rating is the Underwriters Laboratories Vertical Burn Standard described above. The tensile strength and percent elongation at break of each example is tested according to ASTM D412.

The results show the TPU compositions of the present invention have much higher LOI values than the comparative TPU compositions. These LOI values are not possible in non-halogen flame retardant TPU composition currently known. In addition, some examples show the TPU compositions of the present invention have much higher LOI while also maintaining very high tensile strength, and in some still further embodiments even the percent elongation at break as well. This is a surprising combination of results making the TPU compositions of the invention suitable for a wider array of applications than other TPU compositions that have good physical properties but poor flame retardancy and/or other TPU compositions that have good flame retardancy but poor physical properties. While some inventive examples do show a significant impact to the physical properties of the overall composition, such as the percent elongation at break, the broader set of compositions are still useful and provide a level of flame retardant properties, as measured by LOI, not possible to obtain in the comparative TPU compositions.

Example Set B

A second set of TPU compositions is prepared using either an aliphatic polycarbonate TPU or an aromatic polycarbonate TPU. The compositions include and exclude various other additives to show the benefits of the present invention. The formulations of the examples are summarized in Table 3 below, where all values are percent by weight. The results obtained from these examples are summarized in Table 4 below.

TABLE 3

| Component | Inv Ex B-1 | Comp Ex B-2 | Inv Ex B-3 | Inv Ex B-4 | Inv Ex B-5 |
|---|---|---|---|---|---|
| Aliphatic PC TPU | 50.7 | | | | |
| Aromatic PC TPU | | 57.7 | 50.7 | 44.7 | 44.7 |
| Aromatic Phosphate | 7.0 | | 7.0 | 7.0 | 7.0 |
| Phosphate Salt | 37.0 | 37.0 | 37.0 | 43.0 | 46.0 |
| Boron Phosphate | 2.0 | 2.0 | 2.0 | 2.0 | 2.0 |
| Magnesium Oxide | | | | | |
| Dipentaerythritol | | | | | |
| PTFE Polymer | | | | | |
| Additive Package[1] | 3.3 | 3.3 | 3.3 | 3.3 | 0.3 |

[1]The additive package used in Examples B-1 and B-2 is the same additive package used in all the examples of Example Set A. The additive package in Examples B-3 and B-4 does not contain any stabilizers, showing their lack of impact on the results. The additive package in Example B-5 is the same as that used in Example B-3 and B-4 except the talc is now also omitted.

TABLE 4

| Test Result[1] | Inv Ex B-1 | Comp Ex B-2 | Inv Ex B-3 | Inv Ex B-4 | Inv Ex B-5 |
|---|---|---|---|---|---|
| LOI | 42 | 49 | 57 | 70 | 66 |
| UL 94 Rating (0.075") | V-0 | V-0 | V-0 | V-0 | V-0 |

TABLE 4-continued

| Test Result[1] | Inv Ex B-1 | Comp Ex B-2 | Inv Ex B-3 | Inv Ex B-4 | Inv Ex B-5 |
|---|---|---|---|---|---|
| Tensile Strength (psi) | 2990 | 2340 | 2230 | 1330 | 1500 |
| Break Elongation (%) | 422 | 241 | 383 | 228 | 340 |

[1]LOI is measured by ASTM D2863. The UL 94 rating is the Underwriters Laboratories Vertical Burn Standard described above. The tensile strength and percent elongation at break of each example is tested according to ASTM D412.

The results show the TPU compositions of the present invention have much higher LOI values than the comparative TPU compositions. While some inventive examples do show a significant impact to the physical properties of the overall composition, the compositions are still useful and provide a level of flame retardant properties, as measured by LOI, not possible to obtain in the comparative TPU compositions.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Except where otherwise indicated, all numerical quantities in the description specifying amounts or ratios of materials are on a weight basis. Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention can be used together with ranges or amounts for any of the other elements. As used herein, the expression "consisting essentially of" permits the inclusion of substances that do not materially affect the basic and novel characteristics of the composition under consider-ation.

What is claimed is:

1. A flame retardant thermoplastic polyurethane composition comprising:
   (a) 44.7% to 50.7% by weight of a thermoplastic polycarbonate polyurethane resin, wherein the thermoplastic polycarbonate polyurethane resin consists of aromatic polycarbonate thermoplastic polyurethane resin;
   (b) 7% by weight of an aromatic phosphate;
   (c) 37% to 46% by weight a phosphate salt;
   wherein (a), the thermoplastic polycarbonate polyurethane resin, (b), the aromatic phosphate, and (c), the phosphate salt, are each halogen-free.

2. The flame retardant thermoplastic polyurethane composition of claim 1, further comprising: (d) a boron phosphate, a magnesium oxide, a dipentaerythritol, a polytetrafluoroethylene polymer, or any combination thereof.

3. The flame retardant thermoplastic polyurethane composition of claim 1 wherein (b), the aromatic phosphate, comprises one or more compounds represented by formula (I), formula (II), formula (III), or combinations thereof:

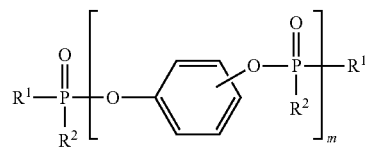

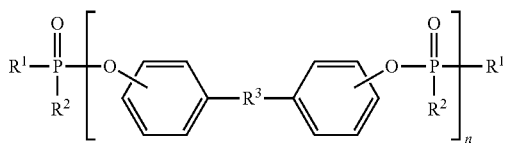

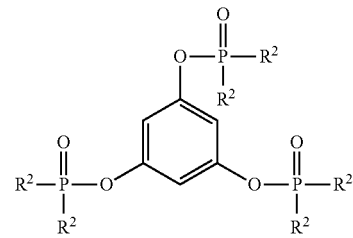

wherein: each $R^1$ is independently a hydrocarbon group or a hydrocarbonoxy group; $R^3$ is a hydrocarbylene group; each $R^2$ is independently a hydrocarbon group or a hydrocarbonoxy group; and m and n are integers from 1 to 30.

4. The flame retardant thermoplastic polyurethane composition of claim 3 wherein component (b), the aromatic phosphate, comprises one or more compounds represented by formula (II) where n is 1 and each $R^1$ and $R^2$ is a hydrocarbon group containing an aromatic ring or a hydrocarbonoxy group containing an aromatic ring.

5. The flame retardant thermoplastic polyurethane composition of claim 1 wherein (b), the aromatic phosphate, comprises bisphenol A diphosphate.

6. The flame retardant thermoplastic polyurethane composition of claim 1 wherein (c), the phosphate salt, comprises amine phosphate, melamine phosphate, dimelamine phosphate, melamine pyrophosphate, dimelamine pyrophosphate, ammonium polyphosphate, melamine polyphosphate, ethylenediamine phosphate, melamine nitrilotrisphosphonate or a combination thereof.

7. The flame retardant thermoplastic polyurethane composition of claim 1 wherein (c), the phosphate salt, comprises a polyphosphoric acid ammonium salt, a polyphosphoric acid melamine salt, or a combination thereof, and wherein the composition further comprises zinc oxide.

8. The flame retardant thermoplastic polyurethane composition of claim 1 wherein:
   (b), the aromatic phosphate, comprises bisphenol A diphosphate; and
   (c), the phosphate salt, comprises a polyphosphoric acid ammonium salt, a polyphosphoric acid melamine salt, or a combination thereof, where the composition further comprises zinc oxide.

9. A method of increasing the Limiting Oxygen Index (LOI) of a flame retardant thermoplastic polycarbonate polyurethane composition comprising the steps of:
   (1) adding to a thermoplastic polycarbonate polyurethane resin, wherein the thermoplastic polycarbonate polyurethane resin consists of an aromatic polycarbonate polyurethane resin, an aromatic phosphate flame retardant and a phosphate salt flame retardant;

wherein the thermoplastic polycarbonate polyurethane resin, the aromatic phosphate flame retardant, and the phosphate salt flame retardant, are each halogen-free; resulting in a thermoplastic polycarbonate polyurethane composition with a LOI higher than that of the thermoplastic polyurethane resin, wherein the composition comprises 44.7% to 50.7% by weight of an aromatic polycarbonate thermoplastic polyurethane resin; 7% by weight of an aromatic phosphate; and 37% to 46% by weight a phosphate salt.

10. A method of making a high LOI thermoplastic polyurethane composition comprising the steps of mixing:

(a) 44.7% to 50.7% by weight of a thermoplastic polycarbonate polyurethane resin, wherein the thermoplastic polycarbonate polyurethane resin consists of an aromatic polycarbonate thermoplastic polyurethane resin;

(b) 7% by weight of an aromatic phosphate; and (c) 37% to 46% by weight of a phosphate salt;

wherein the thermoplastic polycarbonate polyurethane resin, the aromatic phosphate flame retardant, and the phosphate salt flame retardant, are each halogen-free.

* * * * *